May 24, 1927.　　　　　　　　　　　　　　　　1,630,059
A. Y. DODGE
BRAKE
Filed April 17, 1925　　　3 Sheets-Sheet 2
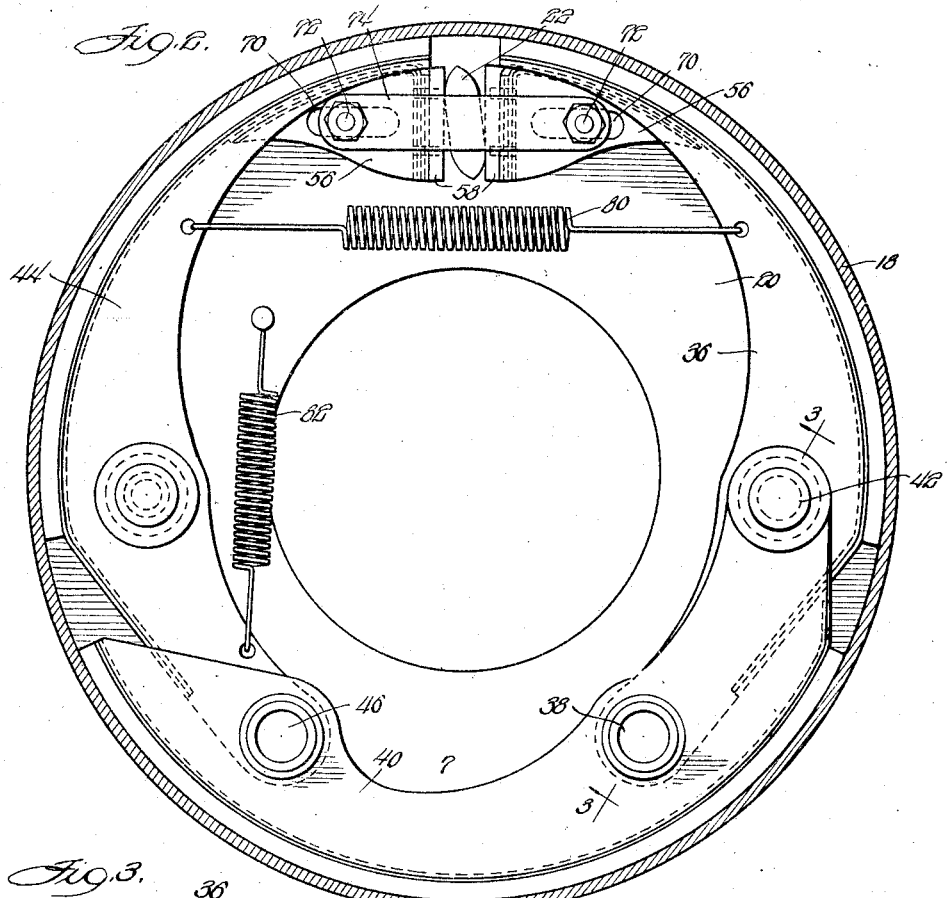
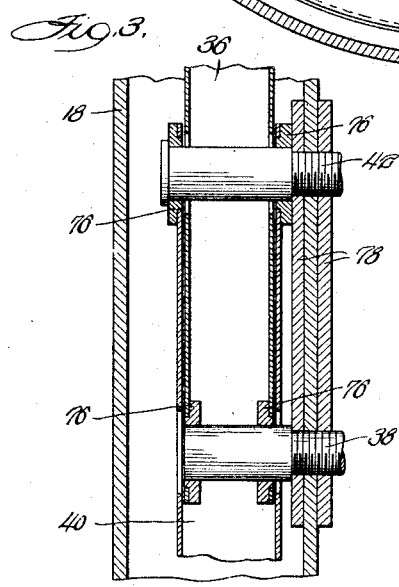
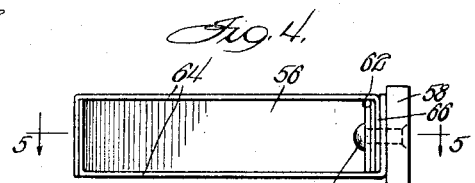
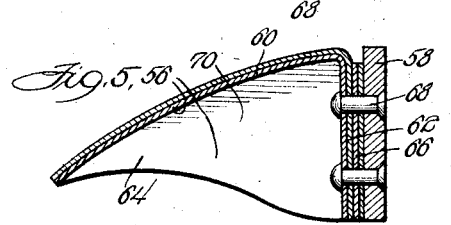
Inventor:
ADIEL Y. DODGE
By M. W. McConkey

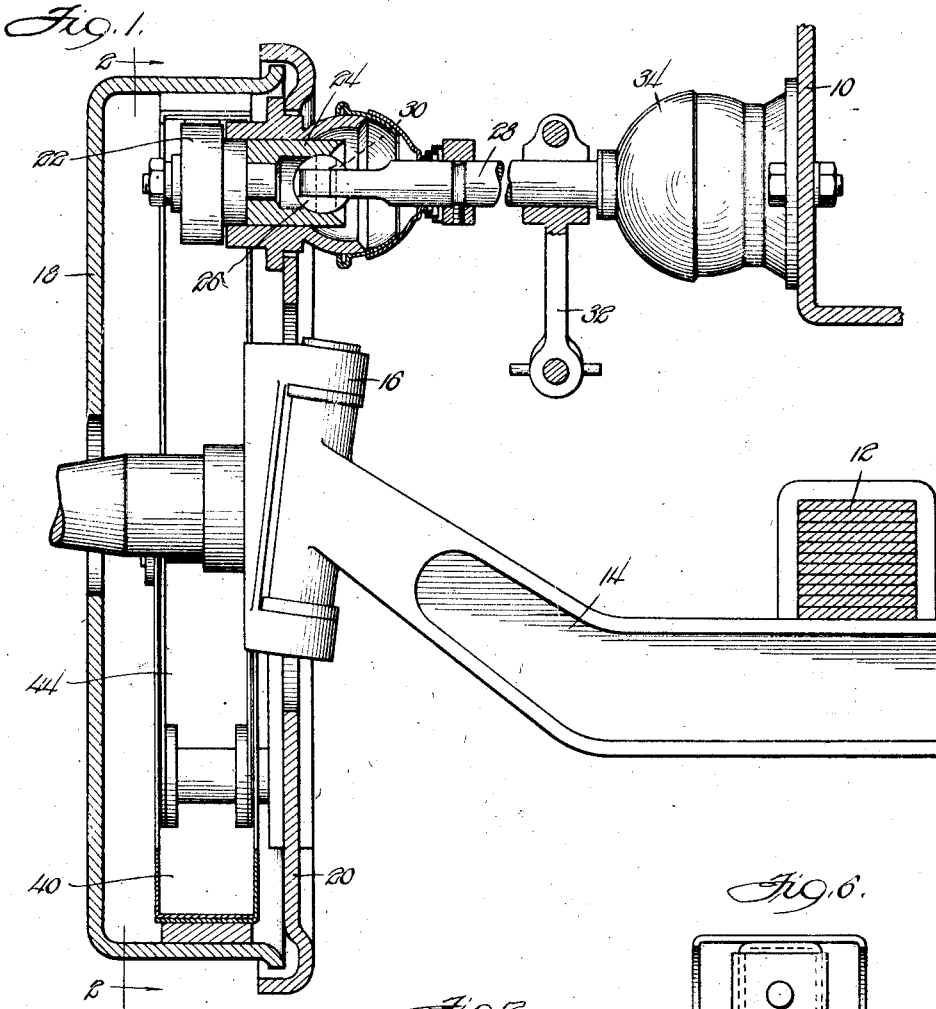

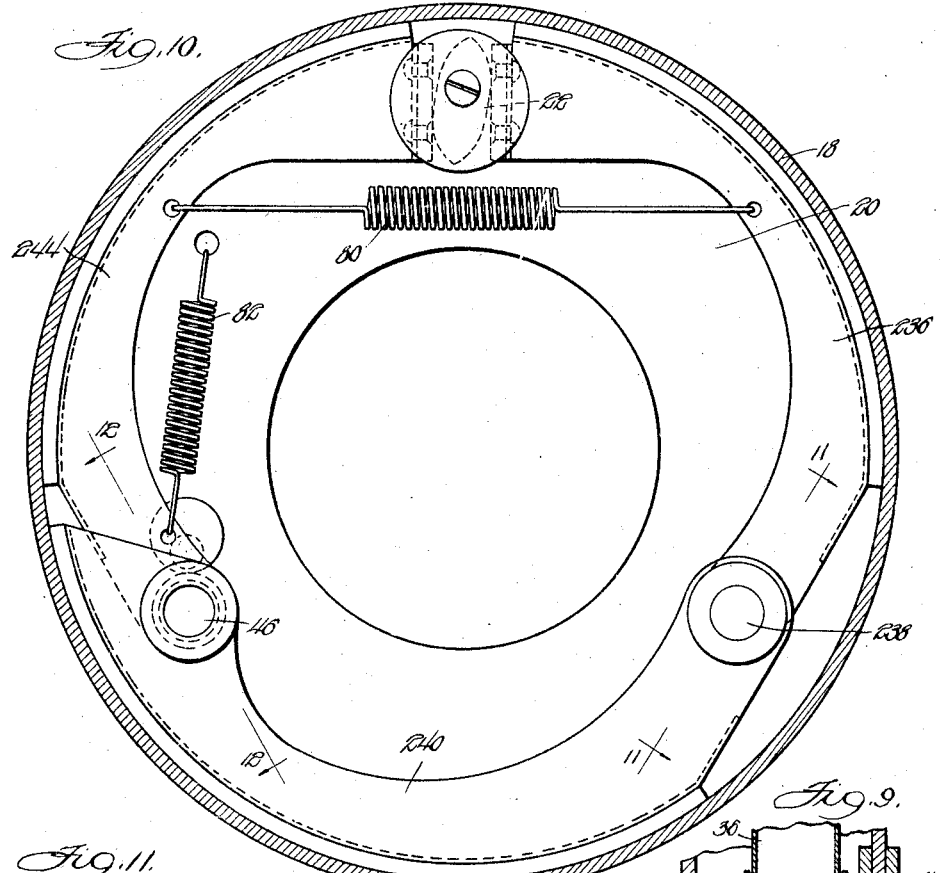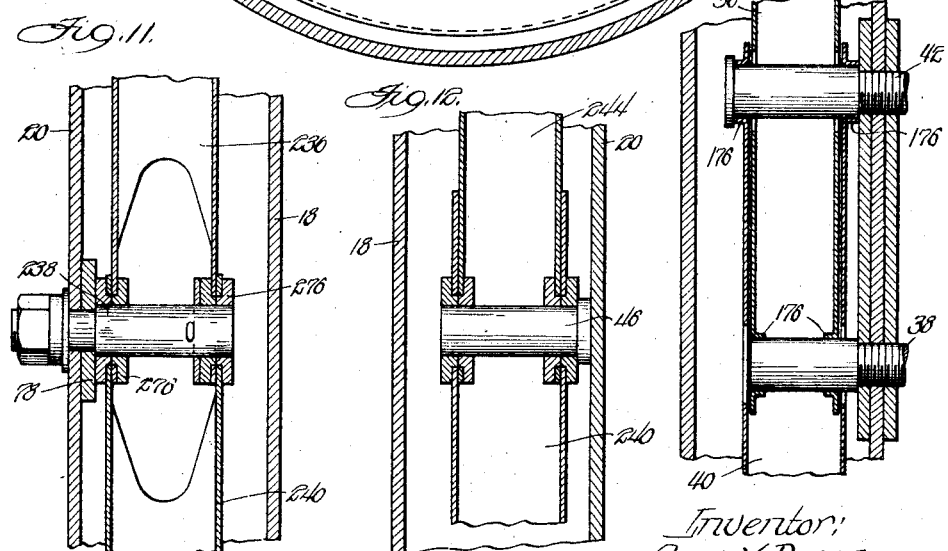

Patented May 24, 1927.

1,630,059

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed April 17, 1925. Serial No. 23,763.

This invention relates to brakes, and is illustrated as embodied in a three-shoe brake for an automobile. Objects of this invention are to improve the arrangement of the shoes, etc., of such a brake, and also to lessen the cost by providing novel shoes of channel section, which can be pressed or stamped of sheet metal.

The above and other objects and features of the invention, including various novel combinations of parts and desirable particular constructions, will be apparent from the following description of two illustrative embodiments shown in the accompanying drawings, in which:

Fig. 1 is a transverse vertical section through one front brake, together with associated parts of the chassis;

Fig. 2 is a vertical section on the line 2—2 of Fig. 1, showing the brake shoes in side elevation;

Fig. 3 is a section on the line 3—3 of Fig. 2, showing the anchors of the brake shoes;

Fig. 4 is a bottom plan view of one of the carriers for the cam plates;

Fig. 5 is a section through the carrier, on the line 5—5 of Fig. 4;

Fig. 6 is an end elevation of one of the shoes, showing the cam plate and its carrier;

Fig. 7 is a section transversely through one of the brake shoes;

Fig. 8 is a similar section through a shoe of modified form;

Fig. 9 is a view corresponding to Fig. 3, but showing shoes of modified form;

Fig. 10 is a view corresponding to Fig. 2, but showing somewhat different shoes;

Fig. 11 is a section on the line 11—11 of Fig. 10, showing the anchor of the shoes; and Fig. 12 is a section on the line 12—12 of Fig. 10, showing the connection between the shoes.

Both arrangements are illustrated as intended for use in an automobile chassis including a frame 10 supported by springs 12 on a rear axle (not shown) and a front axle 14 having the front wheel knuckles 16 swivelled thereto by the usual king pin. The wheel (not shown) carries a brake drum 18, and the knuckle carries a stationary support such as the backing plate 20.

The brake may be operated by a double cam 22 of a control including a camshaft 24 having a cross bore for connecting members 26 between which the flattened end of a shaft 28 is swivelled by a pin 30, the whole forming a universal joint substantially in line with the king pin. The shaft 28 is operated by an arm 32, and is slidably supported at its inner end by a universal joint 34 carried by the chassis frame 10.

The brakes themselves are of the three-shoe type, the one in Fig. 2 comprising a reverse shoe 36 anchored to the backing plate at 38, a forward shoe 40 anchored at 42, and a servo shoe 44 connected to the forward shoe at 46.

Each shoe is channel shaped in cross section, preferably being formed as in Fig. 7, of two parts each L-shaped in cross section, with superposed circumferential flanges 48 and opposite radial flanges 50. The rivets 52 of the brake lining 54 are shown as passing through the flanges 48. If desired, the shoes may be pressed in channel form in a single piece, as shown at 140 in Fig. 8, the other form being preferred because in the form of Fig. 8, the circumferential part of the channel must bottom in the die when the shoes are pressed out, and when released it springs back more or less. This "spring" is not very uniform, making it difficult to secure accurate curvature of the shoes. In the form of Fig. 7, the flanges 50 may bottom in the die, and a few degrees variation in the "spring" is not of importance.

The free ends of shoes 36 and 44 are provided with bracket-shaped carriers 56 for steel cam plates 58 engaged by the cam 22. Each carrier 56 may, if desired, be made of two interfitting stampings having superposed circumferential flanges 60 riveted or otherwise secured to the inside of the end of the shoe, and bent radially at 62 at the cam end, and also having opposite radial flanges 64 bent over the radial flanges 62 at 66. The plate 58 may be secured by rivets 68, or in any other desired manner. Flanges 64 are formed with slots 70, for posts 72, carrying a plate 74 slidably engaging the edges of the cam plates 58 to confine the shoes laterally.

As appears in Figs. 2 and 3, in order to give the effect of overlapping the shoes, to secure the maximum brake lining surface in engagement with the drum, each of the shoes 36 and 40 is anchored between the ends of the other shoe. Anchor 42 for shoe 40 passes through relatively large openings in the radial side flanges of shoe 36, so that it does not interfere with pivotal movement of that shoe, and similarly anchor 38 for shoe 36 passes through relatively large openings in the side flanges of shoe 40. Bushings 76 may be pressed into openings in the flanges at the end of each shoe, to provide bearings pivoting on the anchor, or tubular sleeves or projections 176 (Fig. 9) may be substituted. The backing plate is preferably reinforced by plates 78 at the anchors.

It should be noted especially that shoes 36 and 44 are identical with each other, and interchangeable, and that they are slightly narrower than shoe 40, so that they fit or "nest" between the radial side flanges of that shoe. This not only facilitates mounting the shoes, but moreover the sliding engagement serves as a guide for the shoes.

The arrangement of Fig. 10 differs from that described above in that it is somewhat cheaper, the overlapping of the shoe anchors being omitted. Shoes 236 and 240, corresponding to shoes 36 and 40, are pivoted on a single anchor 238, bushings 276 or the like being provided (Fig. 11). Shoes 236 and 244 are identical and interchangeable, and are slightly narrower than shoe 240, so that they fit between the radial side flanges of shoe 240 at its opposite ends.

The pivotal connection between shoes 244 and 240 is the same as between shoes 44 and 40, the connecting pin or pivot 46 having a head slidably engaging the backing plate 20, to serve as a "steady rest" for the shoes, and passing through bushings pressed into openings in the radial side flanges of the shoes.

In both arrangements, the reverse and servo shoes are urged inwardly away from the drum by a main spring 80 connected at its opposite ends to the two shoes. An auxiliary spring 82 is connected at one end to the backing plate, and at the other end to the servo shoe near its pivoted end. Spring 82 not only urges the connected servo and forward shoe toward the backing plate, to be steadied by the head of pin 46, but also insures that the forward shoe 40 or 240 will not drag, since the spring holds it away from the drum until overcome by circumferential movement of the servo shoe 44 or 244.

In the operation of the brake the reverse shoe 36 or 236 is most effective to retard rearward movement of the vehicle, since the friction of the drum tends to swing it outwardly on its anchor. When the vehicle is moving forward, the reverse shoe is less effective, since the friction of the drum then tends to swing it inwardly on its anchor, but at that time the servo shoe 44 or 244 is moved counter-clockwise (Fig. 2 or 10) by the friction of the drum to force the forward shoe 40 or 240 against the drum. Moreover the friction of the drum at that time tends to swing shoe 40 or 240 outwardly on its anchor.

The cam or wear plate is secured to the end of each shoe 236 or 244 by providing a substantially radial flange to which it may be riveted or otherwise secured. The flange may be formed in pressing out the shoe, or by folding inwardly the sides, or the sides and bottom, of the channel in the manner shown in Figs. 4 and 5. Each of the shoes may be in one piece, as in Fig. 8, or in two pieces as in Fig. 7. The free ends of the shoes are confined laterally by a plate or the like, which may be secured to the cam, and which projects across the ends of the shoes.

While illustrative embodiments have been described in detail, it is not my intention to limit the scope of the invention to those particular embodiments, or otherwise than by the terms of the appended claims.

I claim:—

1. A brake comprising three shoes, the central shoe being channel-shaped at least at its ends and the two end shoes extending into the channel of the central shoe to cause the three shoes to overlap.

2. A brake comprising a central shoe anchored at one end and channel-shaped at least at the anchored end, an end shoe connected to the unanchored end of the central shoe and arranged to operate it, another end shoe extending inside the channel of the central shoe to overlap it, a torque-taking pivot for said other end shoe between the ends of the central shoe, and brake-applying means acting on said end shoes.

3. A brake comprising, in combination, a pair of shoes of channel section nested one within the other at their adjacent ends, and an anchor for each shoe extending through relatively large openings in the other shoe without interfering with the pivotal movement of the other shoe.

4. A brake comprising, in combination, a shoe of channel section anchored at one end and having relatively large openings in its sides some distance from its anchored end, a second shoe extending at one end between the sides of the first shoe, and an anchor for the second shoe passing through said openings without interfering with pivotal movement of the first shoe.

5. A brake comprising, in combination, a shoe of channel section, an anchor at one end of the shoe pivotally supporting both sides of said shoe, a second shoe extending between the sides of the first shoe at its anchored end without interfering with the anchor of the first shoe, a pivot for the end of the second shoe between the ends of the first shoe so arranged that it does not prevent pivotal movement of the first shoe, a third shoe extending between the sides of the first shoe at its unanchored end and connected thereto, and brake-applying means acting on the second and third shoes.

6. A brake comprising, in combination, a drum, a backing plate, a pair of shoes of channel section having anchors at their adjacent ends on the backing plate, the anchor of each shoe pivotally supporting the two sides of each shoe, and means for forcing the shoes against the drum including a third shoe of channel section engageable with the drum and moved circumferentially by the friction of the drum to force at least one of the pair of shoes against the drum.

7. A brake comprising, in combination, a drum, a pair of shoes anchored at adjacent ends within the drum, and means for forcing the shoes against the drum including a third shoe engageable with and urged circumferentially by the drum, the third shoe being connected with one of the pair of shoes, one of the connected shoes being of channel section and the other extending between and connected to the sides of the channel.

8. A brake comprising, in combination, a channel-section central shoe, a pair of end shoes extending into opposite ends of the channel of the central shoe, and brake-applying means acting on the end shoes and acting on the central shoe through one of the end shoes.

9. A brake comprising, in combination, a drum, a pair of shoes of channel section within the drum, the channel of one shoe being slightly smaller than, and fitting between the sides of, the channel of the other shoe, a pivotal connection between said interfitting sides some distance from the end of the outer shoe, the outer shoe substantially overhanging the connection, and means for forcing one shoe against the drum and causing it to force the other shoe against the drum.

10. A brake comprising, in combination, a pair of shoes having adjacent free ends, a carrier secured to the end of each shoe and formed with an opening, a cam plate secured to each carrier, a double-acting cam between the plates, a stationary post on each side of the cam and projecting through the corresponding opening without restricting movement of the shoe by the cam, and a plate secured to the two posts and crossing the edges of the two cam plates and positioning the shoes laterally.

11. A brake including a drum, a channel-shaped central shoe, shoes extending into opposite ends of the channel of the central shoe, and means for forcing the three shoes against the drum at the same time.

12. A brake including a drum, a channel-shaped central shoe, shoes extending into opposite ends of the channel of the central shoe, together with an anchor for the side flanges at one end of the central shoe and between the ends of the corresponding end shoe, and means for forcing the three shoes against the drum at the same time.

13. A brake including a channel-shaped shoe having side flanges comparatively low at the end of the shoe and sloping to a substantial height some distance from the end of the shoe, and another shoe having a part extending between said flanges and pivoted to them at a point where they are of substantial height and having a friction part terminating immediately adjacent the end of the channel-shaped shoe, so that the channel-shaped shoe overhangs the end of said other shoe for a considerable distance.

14. A brake including an intermediate shoe having spaced flanges at least at its ends, shoes extending between the flanges at opposite ends of the intermediate shoe, and means for taking the torque of all of the shoes including a connection between the intermediate shoe and at least one of the other shoes.

15. A brake including a channel-section intermediate shoe, shoes extending into the opposite ends of the channel of the intermediate shoe, and means for taking the torque of all of the shoes including a connection between the intermediate shoe and at least one of the other shoes.

16. A brake including an intermediate shoe having spaced flanges at least at its ends, other shoes extending between the flanges at opposite ends of the intermediate shoe, and brake-applying means acting on the intermediate shoe through at least one of the other shoes.

17. A brake including a channel-section intermediate shoe and other shoes extending into the opposite ends of the channel of the shoe, and brake-applying means acting on the intermediate shoe through at least one of said other shoes.

18. A brake including a shoe anchored at one end and having spaced flanges at least at its other end, and another shoe extending between the spaced flanges and connected to the anchored shoe some distance from its unanchored end.

In testimony whereof I have hereunto signed my name.

ADIEL Y. DODGE.